United States Patent [19]

Corcoran

[11] Patent Number: 5,547,172
[45] Date of Patent: Aug. 20, 1996

[54] HYDRAULIC ANTIVIBRATION SUPPORTS, AND TO METHODS OF MANUFACTURING THEM

[75] Inventor: Patrick E. Corcoran, Rockford, Mich.

[73] Assignee: Hutchinson, Paris, France

[21] Appl. No.: 427,705

[22] Filed: Apr. 24, 1995

Related U.S. Application Data

[63] Continuation of Ser. No. 177,469, Jan. 5, 1994, abandoned.

[30] Foreign Application Priority Data

Dec. 9, 1993 [FR] France .................................. 93 14811

[51] Int. Cl.⁶ .................................................. F16M 5/00
[52] U.S. Cl. ...................... 267/140.13; 267/293; 248/562
[58] Field of Search ........................ 267/140.12, 140.13, 267/219, 220, 141.2, 140.3, 293, 140.5; 180/300; 248/562, 636

[56] References Cited

U.S. PATENT DOCUMENTS

| | | | |
|---|---|---|---|
| 4,157,227 | 6/1979 | Hadle .................................. | 267/293 X |
| 4,840,359 | 6/1989 | Hamaekers et al. ................ | 267/219 X |
| 4,848,756 | 7/1989 | Funahashi et al. .................. | 267/293 X |
| 4,936,556 | 6/1990 | Makibayashi et al. . | |
| 4,953,833 | 9/1990 | Schmidt et al. ..................... | 267/219 X |

FOREIGN PATENT DOCUMENTS

| | | |
|---|---|---|
| 0262840 | 4/1988 | European Pat. Off. . |
| 0293726 | 12/1988 | European Pat. Off. . |
| 0543082 | 5/1993 | European Pat. Off. . |
| 2655113 | 5/1991 | France . |
| 3804123 | 8/1989 | Germany . |
| 3910570 | 10/1989 | Germany . |
| 4026370 | 3/1992 | Germany . |
| 4137692 | 7/1993 | Germany . |
| 2239507 | 7/1991 | United Kingdom .............. 267/140.12 |

OTHER PUBLICATIONS

Patent Abstracts of Japan; vol. 15, No. 457 (M–1181) 20 Nov. 1991 & JP–A–03 194 237 (Nissan Motor Co Ltd) *abstract*.
Patent Abstracts of Japan; vol. 14, No. 331 (M–999) (4274) 17 Jul. 1990 & JP–A–02 113 137 (Bridgestone Corp) 25 Apr. 1990 *abstract*.
Patent Abstracts of Japan; vol. 12, No. 182 (M–702) (3029) 27 May 1988 & JP–A–62 292 941 (Marugo Rubber Kogyo KK) 19 Dec. 1987 *abstract*.

*Primary Examiner*—Lee Young
*Attorney, Agent, or Firm*—Larson and Taylor

[57] ABSTRACT

A hydraulic antivibration support includes an inner rigid strength member and an outer rigid strength member which are interconnected by an elastomer body. At least two liquid-filled chambers are defined, at least in part, by the elastomer body and are interconnected via at least one narrow channel. The elastomer body includes a central portion having at least two support arms that extend radially between the inner strength and the outer strength member. The support arms are adapted to support an axial load and enable relative axial motion between the two strength members. Each of the support arms is disposed between two of the chambers. The elastomer body further includes respective flexible walls defining the inside of each chamber, each flexible wall having two lateral edges that extend axially and each of which is connected to a support arm in the vicinity of the outer strength member. Each flexible wall is separated from the central portion of the elastomer body by a slot that extends between the two lateral edges of the flexible wall.

16 Claims, 1 Drawing Sheet

HYDRAULIC ANTIVIBRATION SUPPORTS, AND TO METHODS OF MANUFACTURING THEM

This application is a continuation of application Ser. No. 08/177,469 filed Jan. 5, 1994, now abandoned.

The present invention relates to hydraulic antivibration supports, in particular for mounting a motor vehicle body on a chassis of the vehicle.

FIELD OF THE INVENTION

In particular, the present invention relates to a hydraulic antivibration support of the kind comprising an inner rigid strength member and a tubular outer rigid strength member, said members having parallel axes, the outer member surrounding the inner member, said members being connected to each other by an elastomer body which is subjected to a permanent axial load applied to one of the members, and enabling relative axial motion of said members, the antivibration support further including at least two liquid-filled chambers which are defined at least in part by the elastomer body and which are interconnected by at least one narrow channel.

BACKGROUND OF THE INVENTION

Such an antivibration support is disclosed in document U.S. Pat. No. 4,936,556.

However, the antivibration support disclosed in that document provides no damping of radial vibration between the two tubular strength members.

OBJECT AND BRIEF SUMMARY OF THE INVENTION

A particular object of the present invention is to provide an antivibration support of the kind specified in which radial vibrations between the two tubular strength members are damped.

To this end, according to the present invention, the elastomer body comprises:

firstly a central portion having at least two support arms that extend radially between the inner strength member and the outer strength member, said support arms supporting said axial load and enabling the relative axial displacement of the two members, each of said support arms being disposed between two of the chambers; and secondly respective flexible walls defining the inside of each chamber, each flexible wall having two lateral edges that extend axially and that are each connected to one of the support arms in the vicinity of the outer strength member, each flexible wall being separated from the central portion of the elastomer body by a slot which extends between the two lateral edges of said flexible wall.

By means of this disposition, the static and dynamic axial deformations of the elastomer body give rise to no deformation in the walls of the chambers, with damping of axial vibration motion between the two strength members being obtained solely by the mechanical characteristics of the elastomer material.

Because the axial deformations of the elastomer body do not affect the walls of the chambers, these deformations do not put the liquid contained in those chambers under pressure, which could possibly have the effect of rendering the damping of axial vibration ineffective by impeding axial deformation of the elastomer body, and which could therefore harm the lifetime of the antivibration support.

In addition, axial deformation of the elastomer body gives rise to no traction or shear stress on the axial walls of the chambers, which could give rise to rapid wear of the antivibration support or even to rupture of said axial walls of the chambers when the antivibration support is put under load.

Furthermore, when the strength members of the antivibration support are subjected to radial vibration motion, the axial walls of the chambers are not subjected to any traction stress, thereby further increasing the lifetime of the support.

Finally, when the slots that separate the flexible walls from the central portion of the elastomer body form open spaces, and while radial vibration is of an amplitude that is small, less than the thickness of said open space, and in particular is of high vibration frequency, the relative motion of the two strength members gives rise to no deformation of the chambers, thereby making it possible to avoid transmitting vibrations of high frequency and low amplitude from one strength member to the other.

In contrast, larger amplitude and lower frequency radial oscillation motion gives rise to deformation of the walls of the chambers, and thus causes liquid to circulate through the narrow channels which at certain frequencies are the seat of resonance phenomena that provide effective damping.

It is already known to use hydraulic antivibration supports in which at least one hydraulic chamber is delimited by a flexible wall that is separated from the remainder of the elastomer body for the purpose of damping radial vibration between two tubular strength members. Document DE-A-3 910 570 discloses such an antivibration support.

However, it was not known in the past to combine that structure with an antivibration support that supports a permanent axial load together with all of the advantages that such a combination brings about, as specified above.

In preferred embodiments of the invention, one or more of the following dispositions may be implemented:

each support arm includes an inner radial end and an outer radial end that, at least prior to application of the permanent axial load, are axially offset in the direction opposite to the deformation imparted to the support arm by said axial load;

the permanent axial load is applied to the inner strength member and said inner strength member includes an axial end situated remotely from said load, and said inner strength member presents, at said end, an abutment that co-operates with a backing abutment secured to the outer strength member;

prior to application of the permanent axial load, the abutment is in contact with the backing abutment and imposes axial prestress on the support arm of the elastomer body in the same direction as the load;

the abutment includes an elastomer fitting which co-operates with the backing abutment to limit axial displacement of the inner strength member in the direction opposite to the direction in which the permanent axial load is applied;

the inner strength member includes an axial end situated adjacent to the permanent axial load and, at said end, said inner strength member presents a support which receives said load, said support co-operating with abutments secured to the outer strength member to limit the axial displacement of the inner strength member in the direction in which the load is applied;

the abutments secured to the outer strength member are bosses on the elastomer body;

the elastomer body has four support arms disposed at right angles relative to one another and four flexible walls each defining a respective chamber;

each slot forms an empty space between the corresponding flexible wall and the central portion of the elastomer body; and each slot is occupied, at least in part, by a spacer.

The present invention also provides a method of manufacturing an antivibration support as defined above, in which the inner strength member is tubular, said method including a first step that consists in making the support together with slots of relatively great width, and a second step consisting in reducing the width of said slots by an operation of mechanically radially expanding the inner tubular strength member.

BRIEF DESCRIPTION OF THE DRAWING

Other characteristics and advantages of the invention appear from the following description of an embodiment thereof given by way of non-limiting example and made with reference to the accompanying drawing, in which.

MORE DETAILED DESCRIPTION

Terms such as "vertical, up, down, upper, lower, etc." as used below are given purely to facilitate understanding of the description, and they are not limiting.

Figure 1:
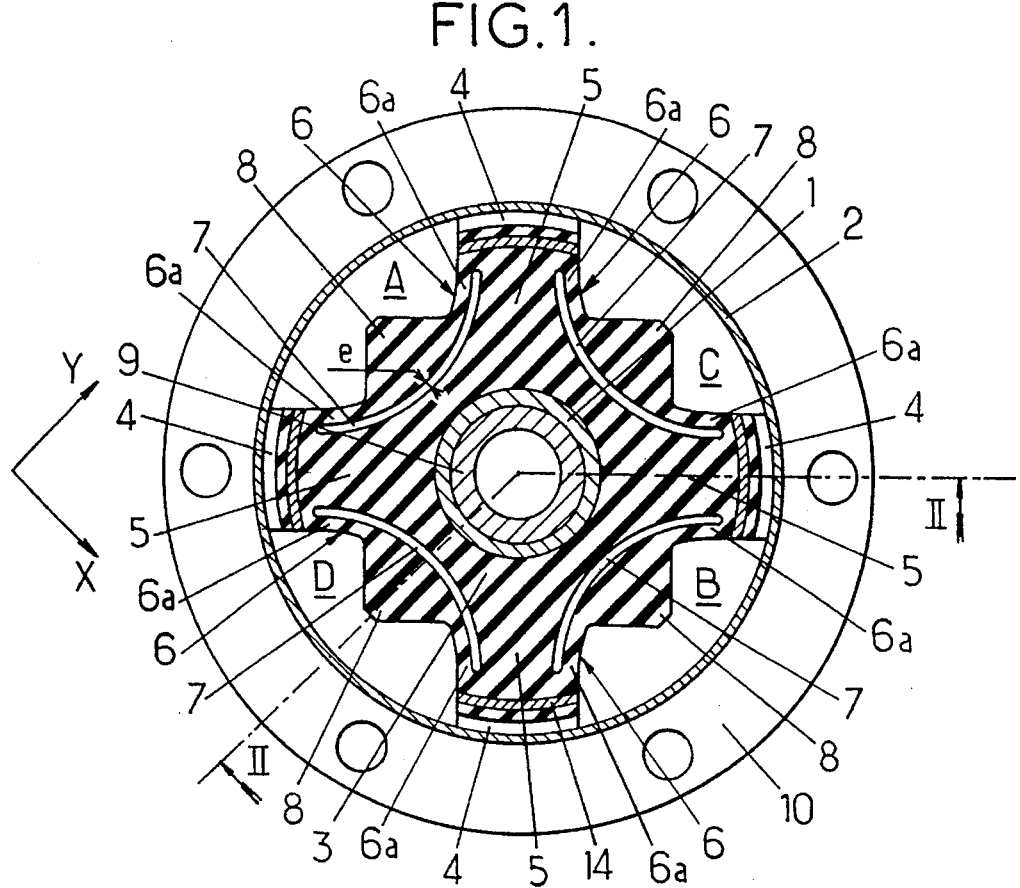
FIG. 1 is a section view through an antivibration support constituting an embodiment of the invention, the section being taken on line I—I of FIG. 2.
Figure 2:
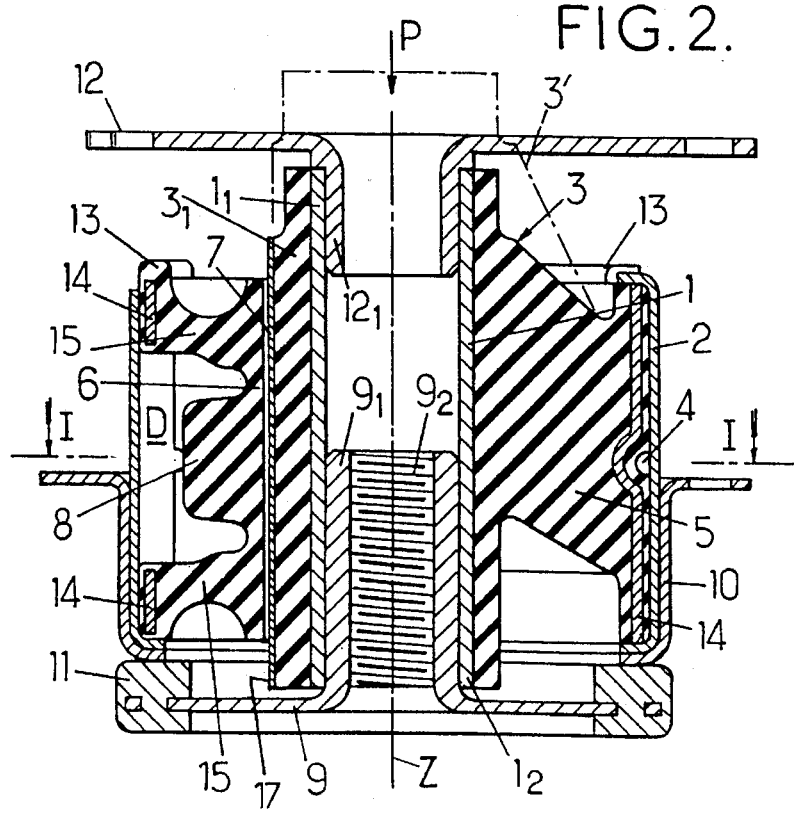
FIG. 2 is a section view on line II—II of FIG. 1.

FIGS. 1 and 2 show a hydraulic antivibration support that is designed specifically for use in mounting a motor vehicle body on a chassis of said vehicle.

The antivibration support comprises two tubular metal strength members 1 and 2, respectively an inner member and an outer member, and in this example they are cylindrical about a common axis Z.

The two tubular strength members are interconnected by an elastomer body 3 which, in the example shown, is molded onto a metal perforated cage 14 disposed in the vicinity of its outer periphery. The elastomer body 3 is vulcanized onto the inner strength member 1 and when the antivibration support is installed, the outer strength member 2 constitutes a force-fit on the elastomer body, and may optionally be subjected to swaging so that the outer peripheral portions of said elastomer body are in sealed contact against the inside surface of the outer strength member 2.

In the particular embodiment described herein, the elastomer body and the outer strength member 2 define four chambers A, B, C, and D which are filled with liquid and which are symmetrically disposed about the common axis Z of the two strength members 1 and 2. The chambers A and B are diametrically opposite each other and they are in alignment on an axis X that is perpendicular to the axis Z, while the chambers C and D are likewise diametrically opposite each other and in alignment on an axis Y that is perpendicular to both axes X and Z.

The elastomer body includes a central portion $3_1$ having four support arms 5 at 90° intervals from one another and extending radially from the inner strength member 1 to the outer strength member 2. Each support arm 5 is disposed between two of the chambers, and at its radially outer end it includes a circumferentially extending groove 4 which constitutes a narrow channel interconnecting said two chambers.

The elastomer body 3 also includes four flexible walls 6 each defining the inside of one of the chambers A, B, C, and D. Each flexible wall 6 has two axially-extending lateral edges 6a each connected to a radial end of a corresponding one of the two support arms 5 that enclose the chamber associated with said flexible wall 6. Thus, between its two axially-extending lateral edges, each flexible wall 6 is separated from the central portion $3_1$ of the elastomer body 3 by a slot 7 that extends axially over the full height of the elastomer body.

At each axial end of the elastomer body, each flexible wall 6 also extends all the way to the outer strength member 2 by means of a substantially radial wall 15.

When the antivibration support is mounted in a vehicle, the outer strength member 2 is fixed to the chassis of the vehicle, whereas the inner strength member 1 is fixed to the body of the vehicle and it supports a load P that is directed vertically downwards, the axis Z itself extending vertically.

To enable the antivibration support to be mounted in a vehicle, the bottom end of the outer strength member 2 is a force-fit in a cup 10 that has an outwardly directed rim pierced by fixing holes. In addition, the top end of the first strength member 1 is fixed to a support plate 12 on which a bar of the vehicle body can rest. Furthermore, each support plate 12 co-operates with bosses 13 on the elastomer body to put a downward limit on axial motion of the inner strength member 1.

Finally, an abutment plate 9 is fixed to the bottom end $1_2$ of the inner strength member 1, and said abutment plate includes an annular elastomer fitting 11 which is designed to come into abutment against the cup 10 for the purpose of limiting upward displacement of the inner strength member 1.

In the example shown, the support plate 12 includes a tubular fixing member $12_1$ which is merely engaged inside the inner strength member 1, and the abutment plate 9 also includes a tubular fixing member $9_1$ which is provided with an inside thread $9_2$ and which is a force-fit in the inner strength member.

These force-fits are used in initial assembly of the antivibration support, prior to its being installed in a vehicle. Thereafter, when the antivibration support is being installed in a vehicle, the fixing member $9_1$ is secured to the bodywork bar that is placed on the support plate 12 by means of a bolt (not shown) that passes through said bar and that is screwed into the inside thread $9_2$.

The load P is taken up solely by the support arms 5 of the elastomer support, and the radially inner ends thereof move axially downwards when said load P is applied. In order to reinforce the strength of said support arms 5 subjected to the load P, the support arms 5 are molded so that their radially inner ends are disposed higher than their radially outer ends, as shown in chain-dotted outline in FIG. 2 under the reference 3'.

When the abutment plate 9 is fixed by forcing its fixing member $9_1$ into the inner strength member 1, the inner strength member 1 is subjected to first downward axial displacement by the fitting 11 coming into abutment against the cup 10, said displacement imparting axial compression prestress to the support arms 5 which then take up the position shown in solid lines in FIG. 2. Because of this prestress, the axial deformation of the elastomer body is reduced on application of the load P, thereby facilitating assembly of the vehicle body on the chassis, and also limiting the total axial displacement of the inner strength member 1 relative to the outer strength member 2.

After the load P has been applied, the fitting 11 on the abutment plate 9 is no longer in abutment against the plate 10, but the support plate 12 is still situated at a certain distance above the bosses 13 on the elastomer body, so that the inner strength member 1 can move axially upwards and downwards over a certain distance relative to the outer strength member 2, thereby enabling it to absorb axial vibration motion between the two strength members. The antivibration support has low stiffness relative to such axial vibration.

Application of the load P, and similarly axial vibration motion between the two strength members give rise to no deformation of the chambers A, B, C, and D.

Similarly, when the two strength members 1 and 2 are subjected to radial vibration motion at high frequency and low amplitude, said motion gives rise to little or no deformation of the chambers A, B, C, and D, thereby making it possible to avoid transmitting said motion from one strength member to the other.

In contrast, when both strength members 1 and 2 are subjected to vibratory or oscillatory motion of larger amplitude, said motion gives rise to deformation of the flexible walls 6 of the elastomer body, thereby causing liquid to move between the chambers, via the narrow channels 4. Thus, at certain predetermined frequencies, that depend essentially on the shape of the narrow channels 4, said narrow channels are the seat of resonance phenomena that enable highly effective damping to take place of the vibration or of the oscillation. In addition, in order to limit the radial displacement of the inner strength member 1 relative to the outer strength member 2, the flexible walls 6 include bosses 8 that are directed radially outwardly and that are adapted to come into abutment against the outer strength member 2.

The antivibration support of the invention may optionally include only two chambers A and B that are diametrically opposite and in alignment on the axis X. Under such circumstances, the elastomer body has only two support arms 5 that may be diametrically opposite and in alignment along the axis Y, together with two flexible walls 6.

While the elastomer body 3 is being manufactured, which is done by molding, it is advantageous for the slots 7 to be of relatively large width e. The slots 7 are formed by cores in the mold in which the elastomer body is formed, and such cores must be quite thick in order to have adequate strength.

Under such conditions, it may be advantageous to reduce the width of the empty space formed by the slots 7 after the elastomer body has been molded, should the width e obtained directly after molding be greater than the desired final width.

This reduction in width may be achieved by inserting part-cylindrical spacers 17 in the slots 7 (FIG. 2). These spacers 17 are preferably narrower than the width e of the slots 7 and they are retained in the slots 7 by the lower abutment plate and by the support plate 12, or by any other means.

In a variant, it is possible to reduce the width e of the slots 7 by an operation of radially expanding the inner tubular strength member 1 mechanically.

I claim:

1. A hydraulic antivibration body mount adapted to support a permanent vertical load of a vehicle body, comprising:

an inner rigid strength member and a tubular outer rigid strength member, said inner member having a vertical longitudinal axis, the outer member horizontally surrounding the inner member, and one of said strength members being adapted to have applied thereto the vertical load parallel to the vertical longitudinal axis, an elastomer body connecting said members to each other which enables relative vertical and horizontal motion of said members, at least two liquid-filled chambers which are defined at least in part by the elastomer body and which are interconnected by at least one narrow channel, wherein the elastomer body comprises:

a central portion having at least two slanting support arms that extend radially and axially downward from the inner strength member to the outer strength member, said support arms adapted to vertically support the vertical load by a compression thereof and enable the relative vertical and horizontal displacement of the two members by a resiliency thereof, each of said support arms being disposed between two of the chambers, and each said slanting support arm including an inner horizontal top end and an outer horizontal top end with said inner horizontal top end located vertically above said outer horizontal top end in order to adapt said slanting support arm to effectively oppose the compressive deformation imparted to the support arm by the vertical load;

flexible walls each defining the inside of one of said chambers, each flexible wall having two lateral edges that extend vertically and that are each connected to one of the support arms in the vicinity of the outer strength member, each flexible wall being separated from the central portion of the elastomer body by a vertical slot which extends between the two lateral edges of said flexible wall, such that the antivibration body mount thus damps vertical and horizontal vibrations between said strength members and has a low stiffness relative to the vertical vibrations; and vertical abutment surfaces immovable relative to the inner strength member, said vertical abutment surfaces facing horizontally outwardly and cooperating respectively with the flexible walls which define the chambers to deform said flexible walls in response to horizontal vibrations, said vertical abutment surfaces extending in use upwardly and downwardly further than said chambers when no vertical vibrations are applied to said elastomer body.

2. An antivibration body mount according to claim 1, in which the inner strength member is adapted to have the permanent vertical load applied at a first vertical end; and in which said inner strength member includes at a second vertical end situated remote from said first vertical end an inner abutment that co-operates vertically with a backing abutment secured to the outer strength member to limit vertical displacement of said inner strength member in a first direction from said second vertical end to said first vertical end.

3. An antivibration body mount according to claim 2, in which the inner abutment imposes a vertical stress on the support arm of the elastomer body in the first direction so that even when the inner abutment is in contact with the backing abutment in the course of vertical oscillations off the inner member the support arms of the elastomer body are subjected to a vertical stress in the first direction.

4. An antivibration body mount according to claim 2, in which the inner abutment includes an elastomer fitting which co-operates with the backing abutment to limit vertical displacement of the inner strength member in a second direction opposite to the first direction.

5. An antivibration body mount according to claim 1, in which the inner strength member includes a first vertical end adapted to be situated adjacent to the permanent vertical load and a second vertical end opposite said first vertical end and, at said first vertical end, said inner strength member presents a support which is adapted to receive the vertical load, said support co-operating with abutments secured to the outer strength member to limit the vertical displacement of the inner strength member in direction from said second vertical end to said first vertical end.

6. An antivibration body mount according to claim 5, in which the abutments secured to the outer strength member are bosses on the elastomer body.

7. An antivibration body mount according to claim 1, in which the elastomer body has four support arms disposed at right angles relative to one another and four flexible walls each defining a respective said chamber.

8. An antivibration body mount according to claim 1, in which each said slot forms an empty space between the corresponding flexible wall and the central portion of the elastomer body.

9. An antivibration body mount according to claim 1, in which each said slot is occupied, at least in part, by a spacer for reducing a width thereof.

10. A hydraulic antivibration support adapted to support a permanent vertical load in a vehicle, comprising:

an inner rigid strength member and a tubular outer rigid strength member, said inner member having a vertical longitudinal axis, the outer member horizontally surrounding the inner member, and one of said strength members being adapted to have applied thereto the vertical load parallel to the vertical longitudinal axis, an elastomer body connecting said members to each other which enables relative vertical and horizontal motion of said members, at least two liquid-filled chambers which are defined at least in part by the elastomer body and which are interconnected by at least one narrow channel, wherein the elastomer body comprises:

a central portion having at least two slanting support arms that extend radially and axially downward from the inner strength member to the outer strength member, said support arms adapted to vertically support the vertical load by a compression thereof and enable the relative vertical and horizontal displacement of the two members by a resiliency thereof, each of said support arms being disposed between two of the chambers, and each said slanting support arm including an inner horizontal top end and an outer horizontal top end with said inner horizontal top end located vertically above said outer horizontal top end in order to adapt said slanting support arm to effectively oppose the compressive deformation imparted to the support arm by the vertical load;

flexible walls each defining the inside of one of said chambers, each flexible wall having two lateral edges that extend vertically and that are each connected to one of the support arms in the vicinity of the outer strength member, each flexible wall being separated from the central portion of the elastomer body by a vertical slot which extends between the two lateral edges of said flexible wall, such that the antivibration body mount thus damps vertical and horizontal vibrations between said strength members and has a low stiffness relative to the vertical vibrations; and vertical abutment surfaces immovable relative to the inner strength member, said vertical abutment surfaces facing horizontally outwardly and cooperating respectively with the flexible walls which define the chambers to deform said flexible walls in response to horizontal vibrations, said vertical abutment surfaces extending in use upwardly and downwardly further than said chambers when no vertical vibrations are applied to said elastomer body.

11. An antivibration support according to claim 10, in which the inner strength member is adapted to have the permanent vertical load applied at a first vertical end; and in which said inner strength member includes at a second vertical end situated remote from said first vertical end an inner abutment that co-operates vertically with a backing abutment secured to the outer strength member to limit vertical displacement of said inner strength member in a first direction from said second vertical end to said first vertical end.

12. An antivibration support according to claim 11, in which the inner abutment imposes an axial stress on the support arm of the elastomer body in the first direction so that even when the inner abutment is in contact with the backing abutment in the course of vertical oscillations of the inner member the support arms of the elastomer body are subjected to a vertical stress in the first direction.

13. An antivibration support according to claim 10, in which the inner strength member includes a first vertical end adapted to be situated adjacent to the permanent vertical load and a second vertical end opposite said first vertical end and, at said first vertical end, said inner strength member presents a support which is adapted to receive the vertical load, said support co-operating with abutments secured to the outer strength member to limit the vertical displacement of the inner strength member in direction from said second vertical end to said first vertical end.

14. An antivibration support according to claim 10, in which each said slot forms an empty space between the corresponding flexible wall and the central portion of the elastomer body.

15. An antivibration support according to claim 10, in which each said slot is occupied, at least in part, by a spacer for reducing a width thereof.

16. An antivibration support according to claim 10, in which there are at least four of said support arms which extend symmetrically in pairs relative to the vertical longitudinal axis.

* * * * *